United States Patent
Audeon et al.

(10) Patent No.: US 8,373,909 B2
(45) Date of Patent: Feb. 12, 2013

(54) SCANNER DEVICE FOR A FRANKING SYSTEM

(75) Inventors: David Audeon, Massy (FR); Francis Coret, Gournay sur Marne (FR)

(73) Assignee: Neopost Technologies, Bagneux (FR)

( * ) Notice: Subject to any disclaimer, the term of this patent is extended or adjusted under 35 U.S.C. 154(b) by 675 days.

(21) Appl. No.: 12/569,534

(22) Filed: Sep. 29, 2009

(65) Prior Publication Data
US 2010/0085612 A1 Apr. 8, 2010

(30) Foreign Application Priority Data
Sep. 29, 2008 (FR) ...................................... 08 56541

(51) Int. Cl.
*H04N 1/04* (2006.01)
(52) U.S. Cl. ......... 358/474; 358/477; 358/498; 358/473
(58) Field of Classification Search .................. 705/404, 705/408, 401, 28; 271/264; 235/375
See application file for complete search history.

(56) References Cited

U.S. PATENT DOCUMENTS

| | | | | |
|---|---|---|---|---|
| 5,493,106 A * | 2/1996 | Hunter | ........................... | 235/375 |
| 6,321,214 B1 * | 11/2001 | Thiel | .............................. | 705/408 |
| 7,558,761 B2 * | 7/2009 | Kummer et al. | .............. | 705/401 |
| 2002/0109288 A1 * | 8/2002 | Bernard et al. | ................ | 271/264 |
| 2005/0071294 A1 * | 3/2005 | Rios et al. | ..................... | 705/404 |
| 2005/0171869 A1 * | 8/2005 | Minnocci | ........................ | 705/28 |

* cited by examiner

*Primary Examiner* — Akwasi M Sarpong
(74) *Attorney, Agent, or Firm* — Sughrue Mion, PLLC

(57) ABSTRACT

A mailpiece scanner device in a module of a franking system, said mailpiece scanner device comprising: a contact image sensor or "CIS" disposed in a direction perpendicular to the conveying direction in which the mailpieces are conveyed through the module; and a support to which said sensor is fastened and which is mounted firstly to move vertically under the action of at least one drive lever and secondly to pivot about a longitudinal hinge pin; the device further comprising guide means secured to a stationary portion of the module for the purpose of limiting firstly the vertical movement of the image sensor support and secondly pivoting of said support about the longitudinal hinge pin.

9 Claims, 4 Drawing Sheets

SCANNER DEVICE FOR A FRANKING SYSTEM

TECHNICAL FIELD

The present invention relates exclusively to the field of mail handling, and it relates more particularly to a scanner device that is suitable for being integrated into an independent module or into any one of the various modules making up a franking system, such as the mailpiece feed module (or "feeder"), the mailpiece weigh module (postal scales), the mailpiece print module (franking machine or "postage meter" proper), or indeed the folding and insertion module (mailpiece folder/envelope stuffer).

PRIOR ART

It is well known that postal authorities or private carriers use complex scanning systems making numerous monitoring and tracking applications possible, in particular for analyzing mailpieces and for sorting them by destination. Unfortunately, those systems are particularly costly, and they are voluminous, in particular because of the use of cameras. They are therefore genuinely advantageous only for a sender who sends large volumes of mail, such as a dispatcher. Scanning mailpieces by means of such technologies is out of the question in a standard franking system that is disposed in the firm's mail room, and that is formed, for example, of a feeder and of a franking machine, and optionally of postal scales and/or of a folder/stuffer.

For such conventional franking systems, it is necessary to use sensors of small size, of the Contact Image Sensor (CIS) type, as currently used, above all, in the scanning units of photocopiers. Unfortunately, in such photocopiers, although the CIS disposed behind the window of the photocopier can move from one end of the window to the other, it is generally positioned at a determined and fixed distance (height) from said window, and thus from the document to be photocopied, regardless of the thickness of said document.

The same does not apply with a franking system. The top faces of the mailpieces are not always plane, and differences in thickness due to their contents or to shape defects resulting from them being conveyed through the system can degrade the quality of the scanning. In addition, the width of the scanned zone is relatively large, and typically greater than 30 centimeters (cm). Depending on the format of the mailpiece, the position of the address of the recipient differs, and it is desirable to be able to scan not only the recipient address but also the other information visible on the mailpiece (amount of the franking or "postage", sender's address, etc.).

A first solution to those problems is given by the scanner device specially adapted to franking systems and illustrated in the Applicant's Patent Application FR 07 57285. In that device, which is placed at a variable height rather than being at a fixed height, the mailpieces are conveyed while keeping a common reference that is the bottom faces of the mailpieces. Thus, regardless of the thickness of the mailpiece, its bottom face thus always passes through the system at the same place.

That device is generally satisfactory in particular for low or medium franking rates. Unfortunately, for high franking rates, it suffers from certain drawbacks mainly resulting from the amplitude of the movement of the sensor, which amplitude can be greater than 20 millimeters (mm) for the thickest mailpieces and thus cause large jolts on the sensor when said sensor falls back down once the mailpiece has gone past it, the resilient means for holding the support of the sensor not providing sufficient shock-absorbing as the sensor is falling back down, and sometimes, in particular for very high franking rates, not being able to avoid contact with the conveying bottom surface of the franking system.

OBJECTS AND DEFINITION OF THE INVENTION

An object of the present invention is therefore to mitigate the above-mentioned drawbacks by installing a CIS sensor in a franking system, which sensor makes it possible to scan the entire surface of each of the mailpieces correctly, regardless of the format (from the business card format to the largest format) and of the thickness of said mailpiece, without giving rise to any damage to the sensor due to the variations in thickness of the scanned mailpieces.

These objects are achieved by a mailpiece scanner device in a module of a franking system, the mailpiece scanner device comprising:
  a contact image sensor or "CIS" disposed in a direction perpendicular to the conveying direction in which the mailpieces are conveyed through said module; and
  a support to which said sensor is fastened and which is mounted firstly to move vertically under the action of at least one drive lever and secondly to pivot about a longitudinal hinge pin;
wherein said mailpiece scanner device further comprises at least one a guide stud mounted on at least one side cheek plate of said image sensor support and suitable for moving within a slot of a guide support secured to a stationary portion of said module, the movement of said stud within said slot limiting firstly the vertical movement of said support and secondly pivoting of said support about said longitudinal hinge pin.

Thus, by using these guide means, it is possible to avoid any impact with the conveying surface for conveying the mailpieces, while also making it easier for the sensor to pivot about its longitudinal axis.

Advantageously, said slot has two horizontal walls and two slanting vertical walls having first and second angles of inclination, said two horizontal walls respectively defining an upper limit and a lower limit for said vertical movement of said support, and said slanting vertical walls respectively defining an upward inclination limit and a downward inclination limit for the pivoting of said support about said longitudinal hinge pin.

Preferably, said first and second angles of inclination are mutually equal.

In an advantageous embodiment, the device may further comprise a plate extending from a longitudinal edge of said support and either presenting a predetermined fixed angle of inclination relative to the horizontal, or else being hinged about a longitudinal pivot pin to pivot between a rest horizontal position, and an inclined position in which it is inclined by a predetermined inclination.

Preferably, the device further comprises one or more resilient elements, one end of which is fastened to said plate and the other end of which is fastened to said support, for assisting with holding said plate on the mailpiece.

Advantageously, said plate has a plurality of successive slopes enabling it to act on the vertical movement of said support differently depending on the thickness of said mailpiece.

Depending on the available space, the scanner device may be mounted in an independent module of the franking system or in one of the following modules of the franking system: feeder; postal scales; franking machine; and folder/stuffer.

The invention also provides any module, independent or otherwise, of a franking system that includes such a scanner device.

BRIEF DESCRIPTION OF THE DRAWINGS

The invention can be better understood on reading the following detailed description of non-limiting illustrative examples given with reference to the following figures, in which.

DETAILED DESCRIPTION OF EMBODIMENTS

Figure 1:
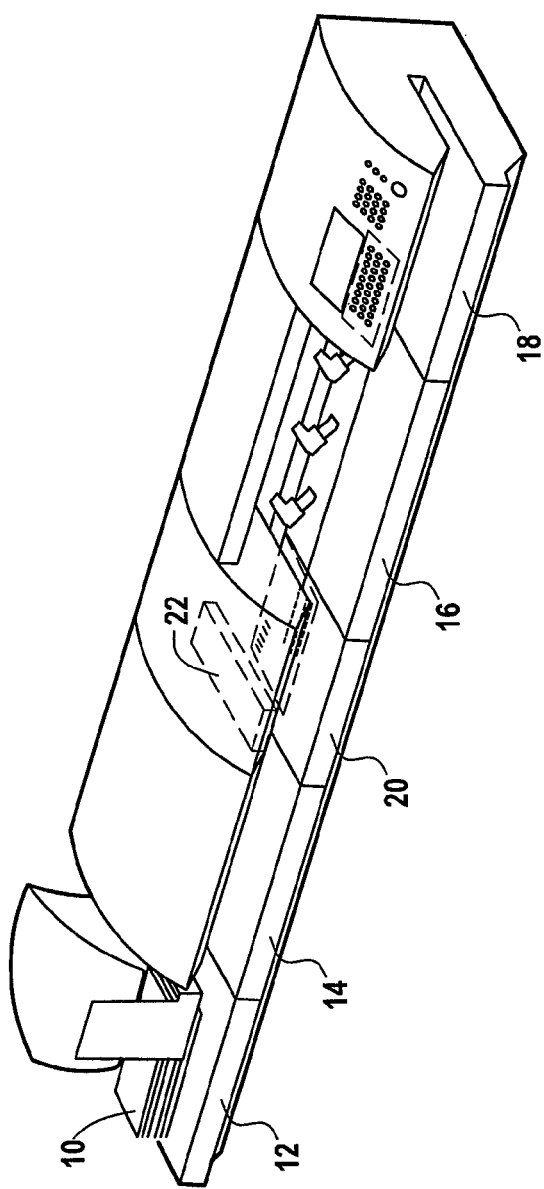
FIGS. 1 and 2 are overall views of franking systems implementing the invention.

FIG. 1 shows a first embodiment of a mailpiece franking system to which the invention is applicable and that, as is known, and disposed from upstream to downstream relative to the advance direction in which the mailpieces 10 advance, includes: a mailpiece feed module 12 designed to receive a stack of mailpieces that are preferably mixed (i.e. of different sizes and weights); a selector and conveyor module 14 for selecting and conveying the mailpieces one-by-one; preferably a dynamic weigh module 16 for determining the weight and optionally the size of each selected mailpiece; and a print module 18 designed to print a postal imprint on each of the mailpieces selected one-by-one and weighed in this way. As is also known, the print module is preferably connected to a server (not shown) of a dealer of said franking system, which server is itself connected to a server (not shown) of a postal authority or of a private carrier handling delivery of the mail.

In this embodiment, the franking system further includes an independent module 20 that is disposed upstream from the dynamic weigh module (but some other configuration is also possible), so as to acquire a digital image of the mailpiece 10, and so as to extract therefrom various data necessary for processing it and tracking it, such as the recipient address or a unique identifier borne by the mailpiece. For this purpose, the module has a scanner device provided with an image sensor 22 associated with bar code recognition software and with optical character recognition (OCR) software. To make it possible to display on a screen all or some of the image of the mailpiece scanned in this way and, if necessary to correct the postal data extracted from said image, the print module is provided with an improved user interface with a keyboard that can be a physical keyboard interacting with a virtual keyboard of the screen which is then advantageously of the touch-sensitive type, or else can be quite simply replaced with a touch-sensitive screen. The print module can also have storage means (not shown) of the database type for storing the image of the envelope scanned in this way.

The sensor is advantageously a Contact Image Sensor (CIS) of the linear type whose length is designed to scan at least a width of a mailpiece that covers the postal imprint and the recipient address, regardless of the format of said mailpiece. The linear optical sensor is typically an integrated module having adjacent semiconductor Charge Coupled Device (CCD) or Complementary Metal Oxide Semiconductor (CMOS) detector cells, collimation optics, and a lighting system which, when it is activated, lights the surface on which the sensor is positioned and delivers, in return, at each of the detector cells, a signal proportional to the light reflected by the surface of the mailpiece.

Figure 2:
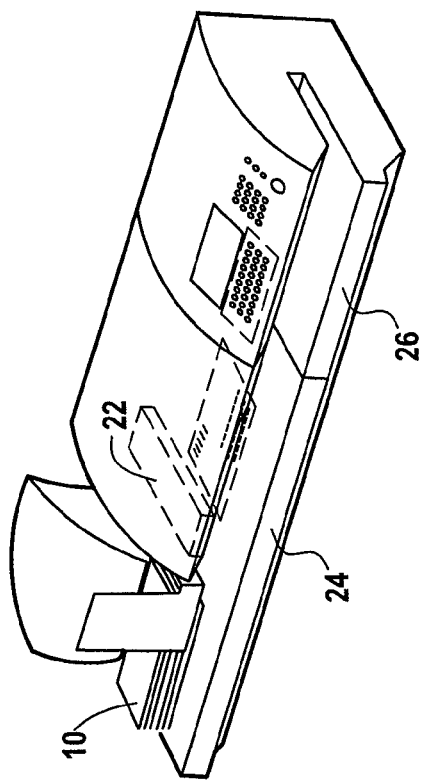

A second example of an embodiment of a franking system that can implement the invention is shown in FIG. 2. As is also known, and disposed from upstream to downstream relative to the advance direction in which the mailpieces 10 advance, it includes: a feed, select, and convey module 24 designed to receive a stack of mailpieces that are preferably mixed (i.e. of different sizes and weights), to select the mailpieces one-by-one, and to convey them one-by-one to a print module 26 designed to print a postal imprint on each of the mailpieces selected one-by-one in this way. As above, the print module can be connected to a server (not shown) of a dealer of the franking system. In this other embodiment, the image sensor 22 of the scanner device that is designed to acquire the digital image of the mailpiece 10, and to extract therefrom the various data necessary for processing it and tracking it is no longer disposed in an independent module of the franking system but rather it is disposed directly in the feed module 24. Naturally, as above, the image sensor is associated with bar code recognition software and with OCR software, and the print module 26 has a user interface that is suitable, if necessary, for correcting OCR errors.

Figure 3:
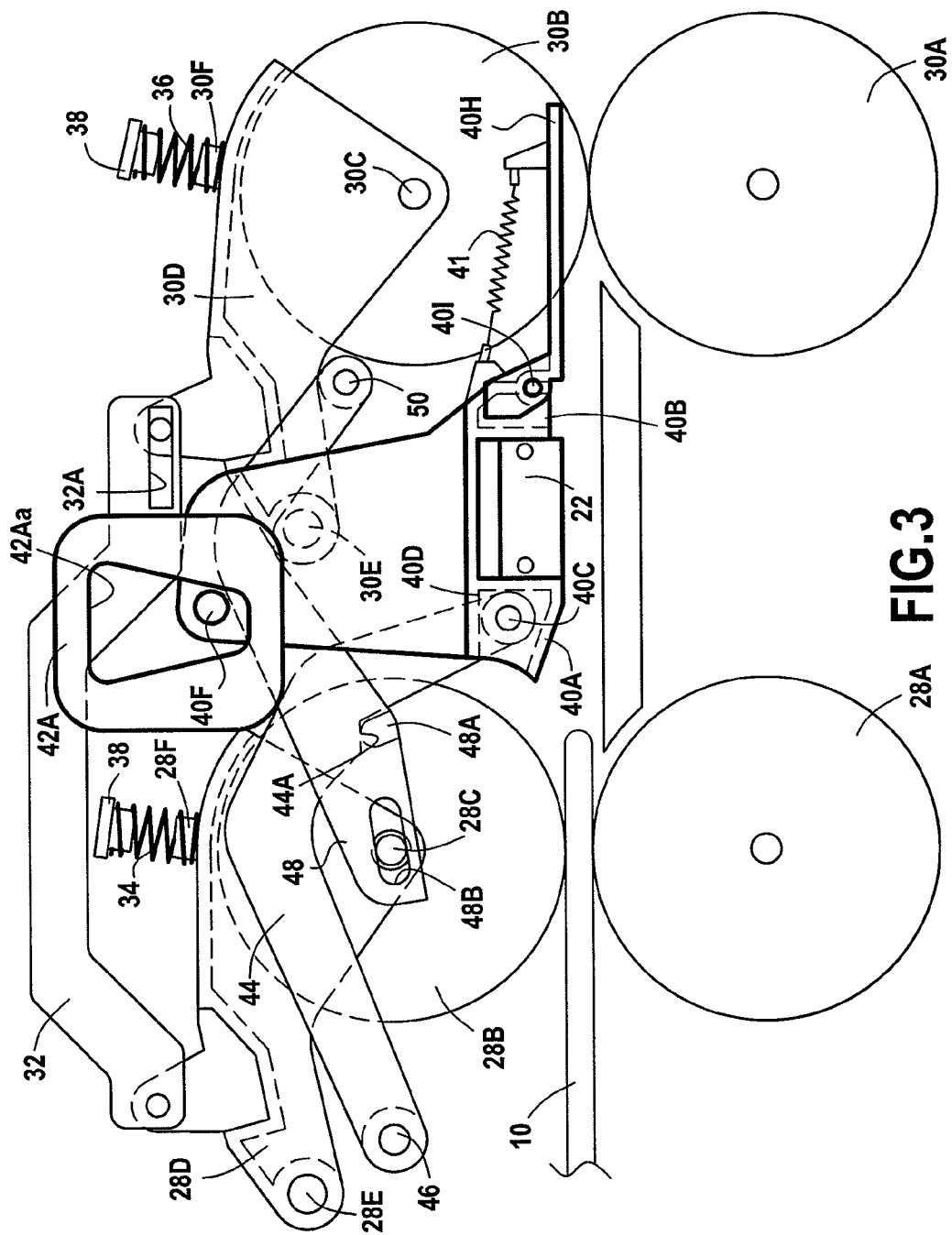
FIGS. 3 and 4 are views respectively in section and in perspective showing an embodiment of the invention.

FIG. 3 is a more detailed view showing how the linear contact image sensor 22 is mounted between the conveyor rollers of the independent module 20 of FIG. 1 or of the feed module 24 of FIG. 2. Each of those modules has a plurality of conveyor rollers formed, for example, of two adjacent sets of superposed rollers, namely a set of front rollers 28A & 28B, and a set of back rollers 30A & 30B, for conveying the mailpieces through the module in question. As is known, the upper rollers 28B, 30B of said sets are mounted to be free to rotate about transverse rotation pins 28C, 30C that extend transversely to the conveyor path along which the mailpieces are conveyed, and that are secured to forks or yokes 28D, 30D for supporting said rollers, which forks are interconnected by a tie 32, one end of which is provided with a slot 32A. In order to adapt to accommodate the various thicknesses of the mailpieces, each of said forks can pivot independently and vertically about a respective stationary hinge pin 28E, 30E in opposition to resilient means 34, 36, one end of each of which is in engagement with a top stud 28F, 30F on the respective roller-support fork, the other end being secured to a stationary portion 38 of the module. The lower rollers 28A, 30A (which could advantageously be replaced with a belt) are motor-driven and are actuated synchronously by various control and monitoring means that are necessary for them to operate and that are known and therefore do not need to be described in any further detail below.

The linear contact sensor 22 is thus disposed between the two adjacent sets of superposed conveyor rollers, and said linear contact sensor is mounted in a moving support 40 that is free both to move vertically and also to pivot about a longitudinal pin 40C, the resulting mobility making it possible for the sensor to track the top surface of the mailpiece that is not uniform, and thus, by moving and by its privileged position in the module, to guarantee optimum scanning quality regardless of the thickness of the mailpieces, in particular when thick envelopes are present. This scanning and the automatic recognition of the various data borne by the mailpiece are performed by processor means (not shown) formed simply by a programmable circuit, as described in the patent application mentioned in the introduction, and synchronized on the basis of pulses from a rotary encoder or merely by detection of changes in light intensity that appear systematically on going from one mailpiece to another. Appropriate OCR or bar code recognition software present in memory means associated with the processor means then make it possible to recognize the address data or code data printed on the mailpieces, and, if necessary, to create a database for addresses and for tracking of said mailpieces.

Figure 4:
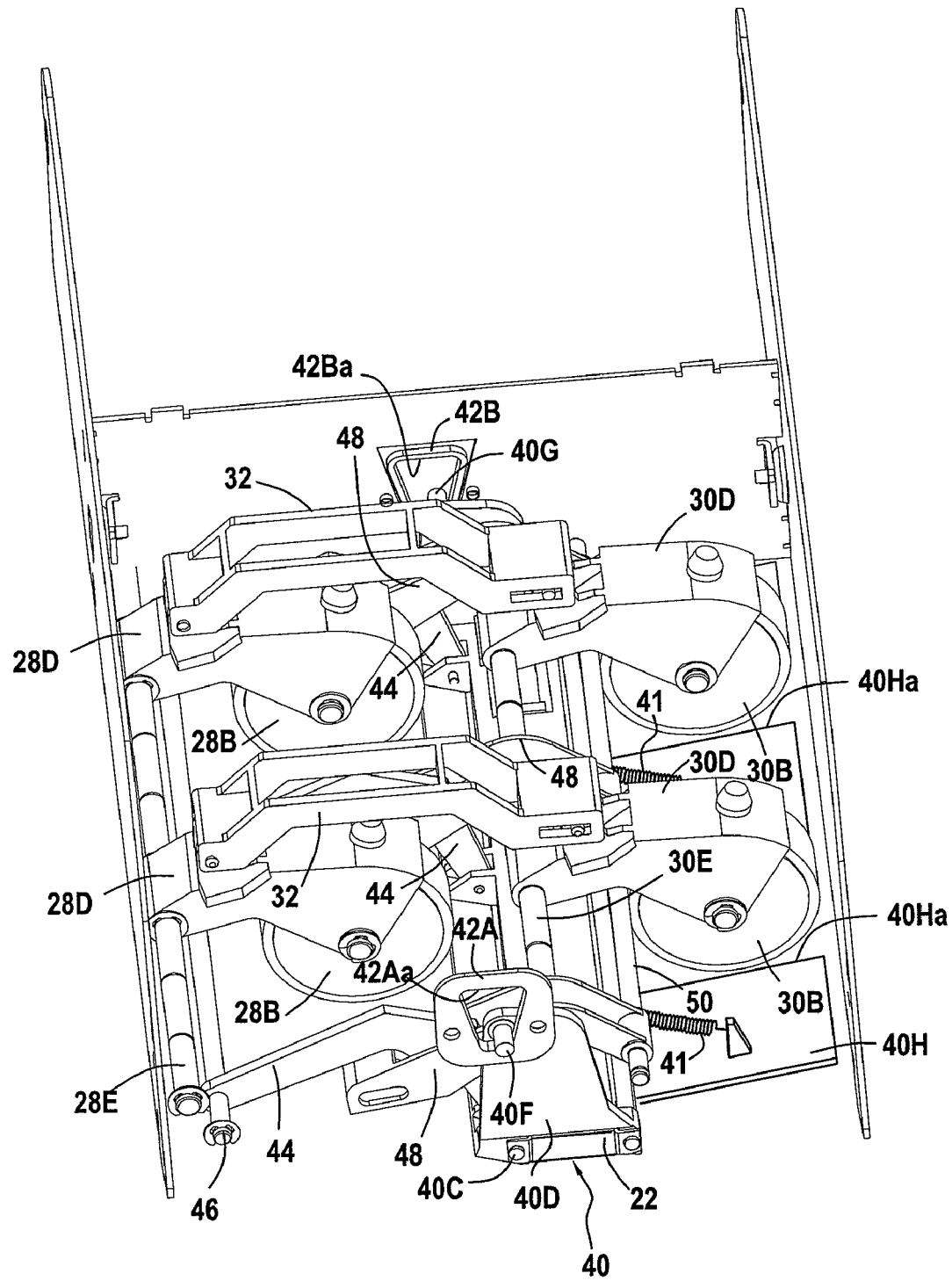
Figure 5:
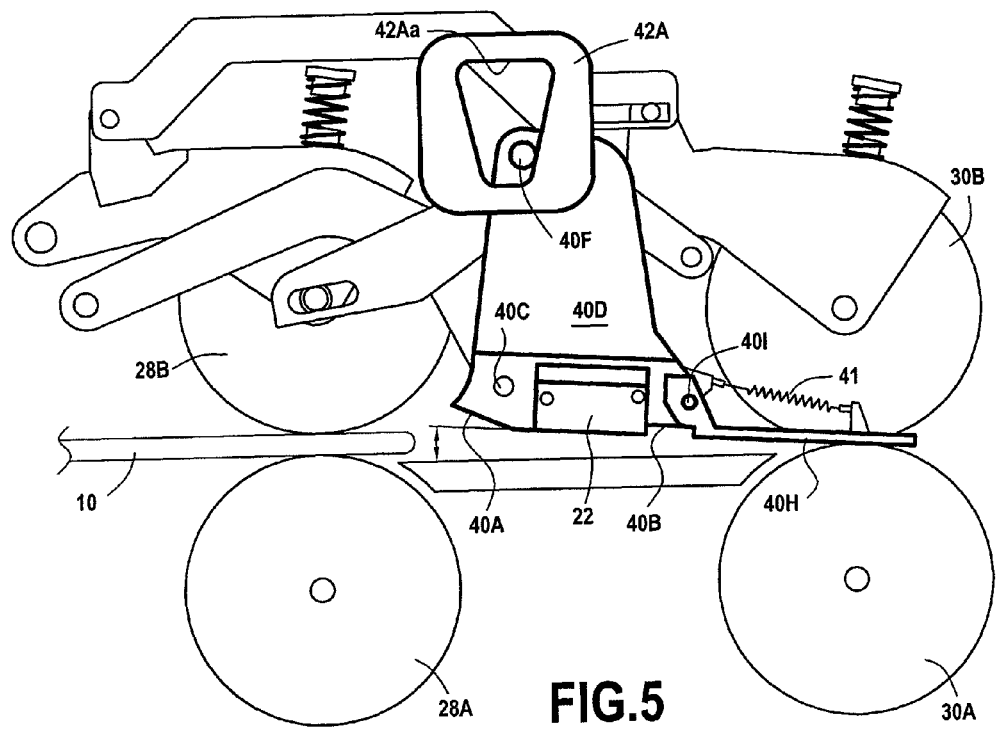
FIGS. 5 and 6 show two possible positions for the for the sensor support of the invention.
Figure 6:
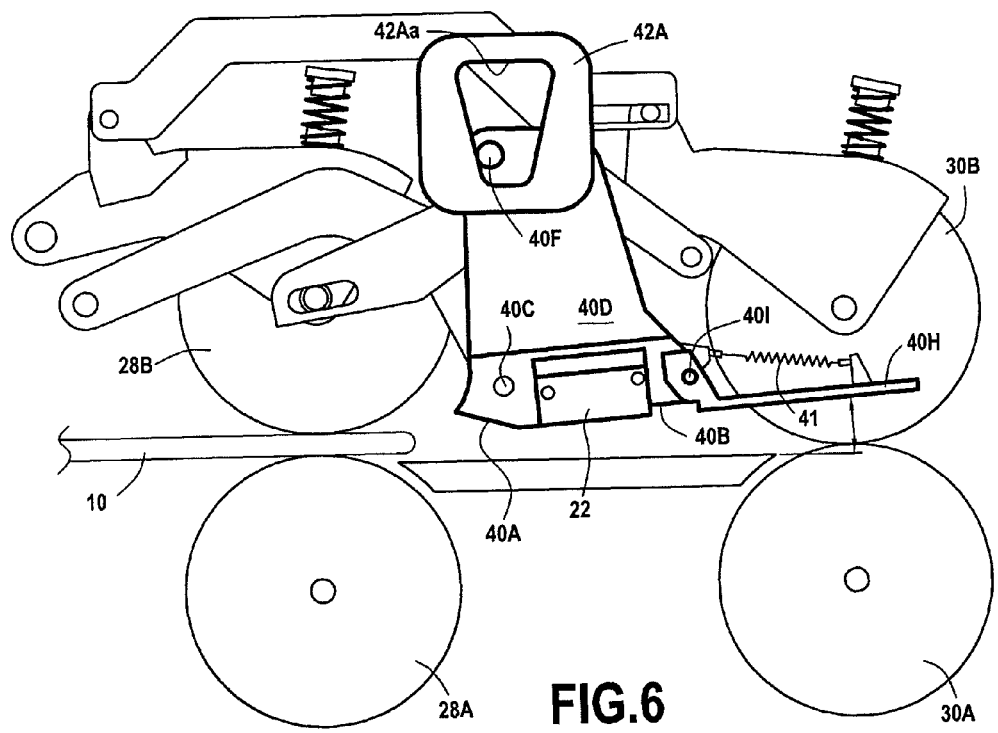

In accordance with the invention, and as also shown in perspective in FIG. 4, the sensor support 40, whose walls are extended by an upstream deflector 40A and by a downstream deflector 40B so as to make it easier for the sensor to rise onto the mailpiece and to descend therefrom, is also provided with two side cheek plates 40D, 40E, each of which is provided with a guide stud 40F, 40G that can move within a slot 42Aa, 42Ba of a guide support 42A, 42B that is secured to the stationary portion of the module. Thus, this slot, which is substantially triangular shaped, defines the movement of the support and thus the movement of the image sensor 22 both vertically and laterally, vertically since the sensor can move vertically only within the limits set by the two horizontal walls of the slot, thereby preventing it either from coming into contact with the conveyor surface for conveying the mailpieces (limit defined by the bottom horizontal wall of the slot) or from moving back up to above a predetermined maximum height (limit defined by the top horizontal wall of the slot), and laterally since the sensor can pivot about its longitudinal axis 40C only within the limits set by the two slanting vertical walls of the slot, so that, depending on the deformation of the mailpiece that the sensor wishes to match, the sensor is either inclined upwards (see FIG. 6) by a first maximum angle of inclination (limit defined by the front slanting vertical wall of the slot) or inclined downwards (see FIG. 5) by a second maximum angle of inclination (limit defined by the back slanting vertical wall of the slot), it being possible for said first and second angles of inclination to be equal or otherwise depending on the desired amplitude of pivoting in each direction.

In order to slow down the descent of the sensor after a mailpiece has gone past, the support 40, and more precisely its downstream deflector 40B, is extended over its entire longitudinal edge by a plate 40H that presents a determined angle of inclination relative to the horizontal, typically lying in the range 0° to 10°. The length of this plate is determined by this angle and by the maximum thickness of the mailpieces that can be processed by the franking machine because the longer the plate, the more the descent of the sensor will be slowed down. Thus, for an article that is not very thick, a shorter plate can be provided. Typically, the length of the plate lies in the range 1 cm to 7 cm. In order to enable the conveyor rollers to pass through it, said plate is provided with notches 40Ha, 40Hb in register with said rollers, thereby imparting a comb shape to said plate. In an alternative embodiment, the plate can be hinged about a longitudinal pivot pin 40I to pivot between a horizontal rest position and a position in which it is inclined by a maximum angle of 10° set by an abutment. One or more resilient elements 41 can assist in holding the plate such that it bears against the mailpiece. Said plate can be convex or can have a plurality of successive slopes that act differently depending on the thickness of the mailpiece, so that, for example, the plate acts on the mailpieces as from a predetermined thickness. If the bearing is too pronounced on thin mailpieces, it might slow down their progress or skew them.

The support is hinged to one end of a drive lever 44 or of each of a plurality of drive levers 44, the other end of the drive lever itself being hinged to a first common hinge pin 46 secured to the stationary portion 38 of the module and disposed upstream from the rotation pins 28C of the front conveyor rollers at a height not less than the maximum thickness of a mailpiece that can be conveyed, but less than the height of the stationary hinge pin 28E of the forks for supporting the front conveyor rollers, i.e., in practice, substantially in the same plane as the rotation pins 28C in their neutral rest positions. Each first drive lever is in the shape of a bridge whose curvature is accentuated to pass over the rotation pin 28C and its bottom face has a bearing zone designed to rest on a raise bar of a second drive lever 48, one end of which is provided with a slot 48B through which it is designed for the corresponding above-mentioned rotation pin 28C of the front conveyor rollers to pass, the other end of said second drive lever being hinged to a second common hinge pin 50 that is secured to the stationary portion 38 of the module and that is disposed downstream from the rotation pins 28C of the front conveyor rollers, and more precisely downstream from the stationary hinge pin 30E of the forks supporting the back conveyor rollers but upstream from the rotation pins 30C of said back transport rollers, at a height greater than the maximum thickness of a mailpiece but less than the height of the stationary hinge pin 30E, preferably substantially in the same plane as the common hinge pin. This second lever is also in the shape of a bridge whose curvature is accentuated to pass over the stationary hinge pin 30E of the forks for supporting the back conveyor rollers, so that the two levers together substantially form an upside-down W figure.

The scanning is performed as follows.

On entering the module, the mailpiece firstly raises the front upper conveyor rollers, thereby automatically raising the corresponding second drive lever, the second end of which is connected to the rotation pin of the corresponding one of said rollers. The second lever being raised then, directly or with a slight delay depending on whether the raise bar is in contact with the corresponding bearing zone, raises the first drive lever which then in turn raises the support for the contact image sensor. Thus, the sensor is raised before the mailpiece comes into contact with it, and the impact with the leading edge of the mailpiece is thus partially attenuated. Similarly, through the effect of the ties, the back upper conveyor rollers are also raised before the mailpiece reaches them.

The mailpiece conveyed by the motor-driven lower conveyor rollers then continues to advance through the module under the image sensor that proceeds to perform the scanning. While the mailpiece is advancing in this way, and if the mailpiece is not fully flat, the sensor then tracks the differences in thickness of said mailpiece by pivoting about its longitudinal axis, within the limits set by the two slanting vertical walls of the slot, and is inclined sometimes upwards and sometimes downwards, depending on the differences, until the back portion of the mailpiece comes out of engagement with the front conveyor rollers, thereby causing the upper rollers to fall back down to their initial rest positions and, correlatively, causing the second drive levers to be lowered. However, since, at this time, the image sensor is still in contact with the mailpiece, the first drive lever does not move, thereby causing the raise bar to be released from the bearing zone, and it is only once the scanning is complete and once the back portion of the mailpiece has gone past the image sensor that said image sensor falls back down again and returns to its initial position, entraining the first lever with it as it descends, until said first lever also returns to is initial rest position in which its bearing zone is in contact with the raise bar of the second lever.

However, the descent of the sensor is not sudden, but rather it is gradual due to the presence of the plate that, by remaining in contact with the mailpiece, makes it possible to maintain the sensor in an intermediate position between its highest position on the mailpiece and its lowest rest position. Thus, when the plate comes out of contact with the mailpiece, the sensor has almost reached said rest position, and the height of its fall is then particularly small and no longer equal to the height of the mailpiece.

It should be noted that, although it can be relatively easy to move the image sensor with a single set of first and second drive levers, it is naturally possible to move it with two or more sets depending on whether the module has one or more series of drive rollers per set of superposed conveyor rollers. Thus, with superposed sets of conveyor rollers, each set comprising two series of conveyor rollers, it is possible to provide a single set of first and second drive levers disposed between said two series of rollers, two sets of first and second drive levers disposed on either side of said two series, or indeed three sets of first and second drive levers disposed firstly between the two series and secondly on either side of said two series. It should also be noted that it is also possible to make provision for an asymmetric configuration with two sets of first and second drive levers flanking one of the two series of conveyor rollers.

What is claimed is:

1. A mailpiece scanner device in a module of a franking system, the mailpiece scanner device comprising:
    a contact image sensor disposed in a direction perpendicular to the conveying direction in which the mailpieces are conveyed through said module; and
    a support to which said sensor is fastened and which is mounted firstly to move vertically under the action of at least one drive lever and secondly to pivot about a longitudinal hinge pin;
    wherein said mailpiece scanner device further comprises at least one guide stud mounted on at least one side cheek plate of said image sensor support and
    suitable for moving within a slot of a guide support secured to a stationary portion of said module, the movement of said stud within said slot limiting firstly the vertical movement of said support and secondly pivoting of said support about said longitudinal hinge pin.

2. A scanner device according to claim 1, wherein said slot has two horizontal walls and two slanting vertical walls having first and second angles of inclination, said two horizontal walls respectively defining an upper limit and a lower limit for said vertical movement of said support, and said slanting vertical walls respectively defining an upward inclination limit and a downward inclination limit for the pivoting of said support about said longitudinal hinge pin.

3. A scanner device according to claim 2, wherein said first and second angles of inclination are mutually equal.

4. A scanner device according to claim 1, further comprising a plate extending from a longitudinal edge of said support and presenting a predetermined fixed angle of inclination relative to the horizontal.

5. A scanner device according to claim 1, further comprising a plate extending from a longitudinal edge of said support and hinged about a longitudinal pivot pin to pivot between a rest horizontal position, and an inclined position in which it is inclined by a predetermined inclination.

6. A scanner device according to claim 1, further comprising one or more resilient elements, one end of which is fastened to said plate and the other end of which is fastened to said support, for assisting with holding said plate on the mailpiece.

7. A scanner device according to claim 1, wherein said plate has a plurality of successive slopes enabling it to act on the vertical movement of said support differently depending on the thickness of said mailpiece.

8. A scanner device according to claim 1, that is mounted in an independent module of the franking system.

9. A scanner device according to claim 1, that is mounted in one of the following modules of the franking system: feeder; postal scales; franking machine; and folder/stuffer.

* * * * *